United States Patent [19]

Klemmer et al.

[11] Patent Number: 4,797,744
[45] Date of Patent: Jan. 10, 1989

[54] METHOD AND CIRCUIT FOR NONLINEAR TRANSMISSION-PROCESSING OF A VIDEO SIGNAL

[75] Inventors: Wolfram Klemmer, Langen; Reinhard Kirschenstein, Rossdorf, both of Fed. Rep. of Germany

[73] Assignee: Robert Bosch GmbH, Stuttgart, Fed. Rep. of Germany

[21] Appl. No.: 61,121

[22] Filed: Jun. 10, 1987

[30] Foreign Application Priority Data

Jun. 23, 1986 [DE] Fed. Rep. of Germany ....... 3620990

[51] Int. Cl.[4] .......................... H04N 5/20; H04N 5/16
[52] U.S. Cl. ........................................ 358/164; 358/32; 358/34; 358/168; 358/169; 358/171; 358/172; 358/174; 358/176
[58] Field of Search ..................... 358/32, 34, 164, 168, 358/169, 171, 172, 174, 176; 328/142, 162; 307/490, 491, 493, 494

[56] References Cited

U.S. PATENT DOCUMENTS

| | | | |
|---|---|---|---|
| 4,202,009 | 5/1980 | Ushiyama et al. | 358/32 |
| 4,249,208 | 3/1981 | Haenen et al. | 358/164 |
| 4,625,240 | 11/1986 | Yablonski et al. | 358/174 |
| 4,651,210 | 3/1987 | Olson | 358/169 |
| 4,682,231 | 7/1987 | Yamakawa | 358/169 |
| 4,686,562 | 8/1987 | Yamanaka | 358/164 |
| 4,701,786 | 10/1987 | Yamanaka | 358/32 |

FOREIGN PATENT DOCUMENTS

0010076  1/1984  Japan ........................... 358/164

*Primary Examiner*—James J. Groody
*Assistant Examiner*—Michael D. Parker
*Attorney, Agent, or Firm*—Frishauf, Holtz, Goodman & Woodward

[57] ABSTRACT

A gamma stage of a television camera is automatically provided with regulation removing effect of variations in temperature, supply voltage and the like by means of two series of control pulses added to the video signal in blanking intervals of the signal before processing by the gamma stage. One series of pulses inserted in the horizontal blanking intervals, is compared after passing through the circuit with a reference value in a gated comparison amplifier providing a constant voltage output for the duration of a horizontal scanning interval, which is utilized to correct the d.c. offset of the video signal before it enters the gamma stage. Another set of control pulses inserted in the vertical blanking intervals is supplied to a gated comparison amplifier to produce an output signal that remains constant for a vertical scanning interval, which is used to provide a multiplicative correction to the output of the gamma stage for controlling the amplification of the circuit as a whole. The output of the multiplicative correction stage proceeds to the usual circuit for d.c. level clamping in the horizontal blanking intervals to produce the output available for further processing, which is also utilized by the comparison amplifiers for regulation purposes.

12 Claims, 2 Drawing Sheets

METHOD AND CIRCUIT FOR NONLINEAR TRANSMISSION-PROCESSING OF A VIDEO SIGNAL

This invention concerns processing a video signal by a nonlinear transmission circuit, such as a gamma stage in a television camera or other so called preliminary distortion or "predistortion" circuits, and more particularly methods and circuits in which pulses are inserted for automatic control of nonlinear processing circuits for video signals.

In television practice, it frequently occurs that video signals are transmitted through nonlinear circuits, such as the gamma stages already mentioned, circuits of logarithmic response of output to input. By a nonlinear circuit is meant a circuit that has a nonlinear transmission characteristic. The use of such a circuit may be referred to as transmission-processing, since the signal is processed on an analog basis by the transmission or transfer characteristic of the circuit, which is nonlinear in the cases with which the present invention is concerned.

In video signal processing in circuits with such nonlinear characteristics, care must be taken that all the variable parameters such as temperature, levels of current or voltage, and so on, are maintained constant since even slight changes of these parameters can produce substantial changes of signal level black value and effective shape of the transfer characteristic curve.

SUMMARY OF THE INVENTION

It is an object of the present invention to provide a method and apparatus for transmission-processing of video signals in which it is possible to obtain nonlinear video signal processing or video signal preliminary distortion which is stable with respect to temperature and at the same time requires no external compensation or balancing.

Briefly, control pulses are inserted in the blanking intervals of the video signals and pass through the nonlinear transmission-processing circuit with the video signal, after which the portion of the output signal corresponding to each inserted pulse is compared with a reference signal during the interval occupied by the pulse to produce a correction signal which is used to modify a video signal in a manner tending to cause the output to control pulses to approach the reference value thereof provided by the reference signal. A correction signal is applied both before a video signal is supplied to the nonlinear transmission-processing circuit and after the video signal has passed through that circuit.

More particularly, a first correction signal, which is constant until a new correction signal is provided by a new comparison operation with the reference signal, is applied additively to the video signal before it is processed by the nonlinear transmisson circuit and a second correction signal, likewise constant until a subsequent comparison replaces it with a new correction signal, is applied multiplicatively to the output of the nonlinear transmission-processing circuit.

The invention has the advantage that the method and circuits operate without necessity of repeated calibration or adjustment and in a manner stable with temperature and independent of the scatter of circuit component characteristics within manufacturing tolerances for the components used in the video circuits. Furthermore, by the use of the invention, a defined portion of the curved shape of the nonlinear characteristic, as by selecting a proper offset voltage, and a particular degree of amplification can be specified and maintained.

The first and second correction signals can be provided by pulses of two different series which may be differently located in the blanking intervals of the video signal for distinguishing the series from each other. Preferably, pulses inserted in the horizontal blanking intervals are used for preliminary additive correction by a d.c. voltage during the line scanning period and pulses inserted in the vertical blanking intervals are utilized for generating a second correction signal in a form of a d.c. voltage that remains constant for a vertical scanning interval which is applied multiplicatively to the output of the nonlinear circuit for determining the amplification level.

The invention is particularly useful when the nonlinear circuit is a gamma stage in a color television camera, because in that case a higher degree of uniformity of operation is obtained among the color channels of the camera output.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
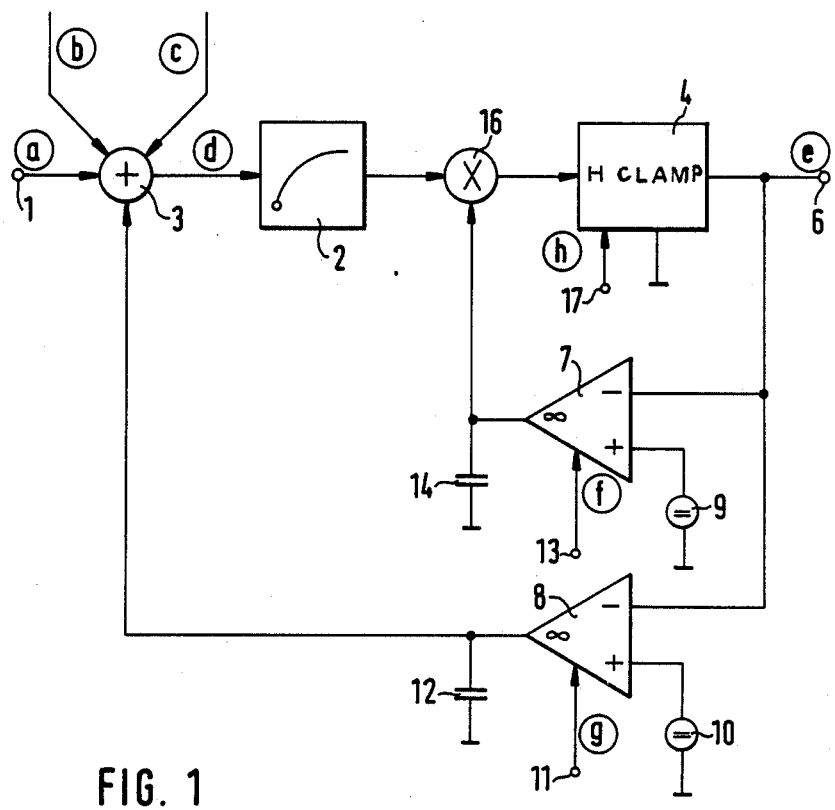
FIG. 1 is a block circuit diagram of apparatus for performance of the method of the invention.
Figure 2A:
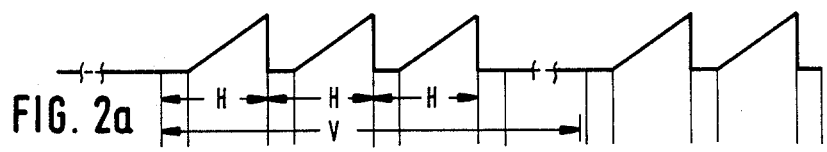
FIG. 2a–2h are a collection of graphical representations, drawn to a common time scale, of signals at various parts of the circuit of FIG. 1.
Figure 2B:
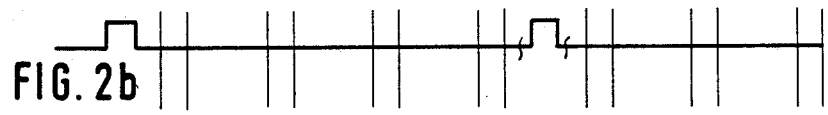
Figure 2C:
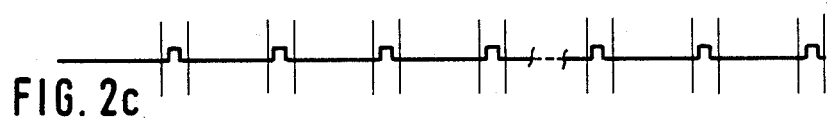
Figure 2D:
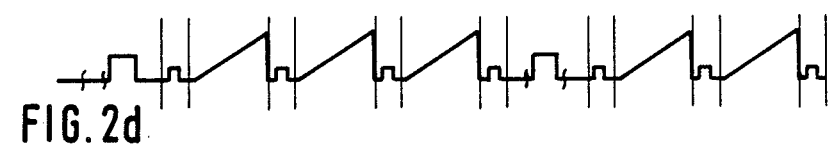
Figure 2E:
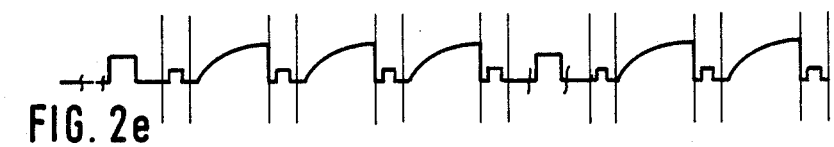
Figure 2F:
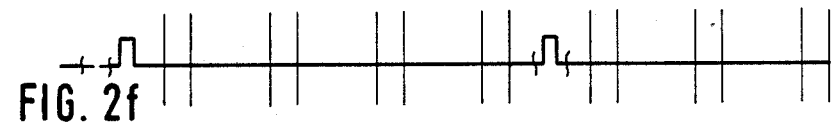
Figure 2G:
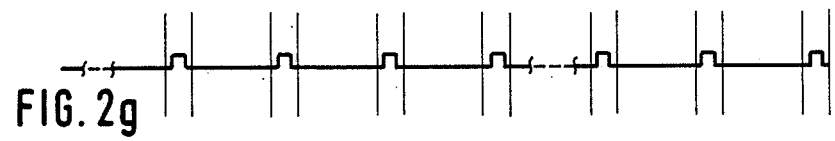
Figure 2H:
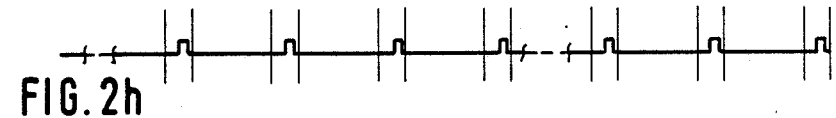

The circuit of FIG. 1 will be explained with reference to the time courses of signals illustrated in FIG. 2. A video signal represented in line (a) of FIG. 2 is provided at the terminal 1 which is to be processed by the nonlinear circuit 2, in the circuit block of which a nonlinear characteristic curve 2' is shown to identify the nature of the circuit which in this case, for example, may be gamma stage in a television camera. Before it is supplied to the nonlinear circuit 2, in accordance with the invention, the input video signal from the terminal 1 goes to an addition stage 3, in which there are added to the video signal a first pulse signal shown in line (b) of FIG. 2 and having pulses occurring in the vertical blanking intervals, and also a pulse signal shown in line (c) of FIG. 2 and having pulses occurring in the horizontal blanking intervals. The remaining input to the addition stage 3, as will be explained later, is a voltage that is constant for the particular horizontal scanning interval and therefore need not be considered in FIG. 2. The output of the addition stage 3 is a signal such as is shown in line (d) of FIG. 2. This is a signal that is supplied to the nonlinear circuit 2 where it is preliminarily distorted or processed in accordance with the nonlinear transfer characteristic of the circuit. This signal, modified by another temporarily constant signal to be considered later, is then supplied to a horizonal clamping stage 4 in which the d.c. level of the video signal is clamped during each horizontal blanking interval. The output of the clamping stage 4 at the output terminal 6 is then a signal as shown in line (e) of FIG. 2.

The signal shown in line (e) of FIG. 2 is supplied with the respective inverting inputs of first and second comparison stages 7 and 8 which are time-gated operational amplifiers. At the noninverting inputs of these comparison stages are respectively provided d.c. voltages from reference signal sources 9 and 10 of values which are equal to the amplitude of the pulse signal respectively shown in lines (b) and (c) of FIG. 2 with a nonlinear modification corresponding to the effect of the circuit 2 under standard conditions. If, for example, a nonlinear circuit 2 operates according to a square-root function, the amplitudes of the reference signals correspond to the appropriate square-root of the amplitude of the inserted pulse signals respectively of lines (d) and (c) of FIG. 2.

The amplifier 8 is gated by a signal shown in line (g) of FIG. 2 supplied to the terminal 11 of FIG. 1, so that during the gate pulses a correction signal is produced is that corresponds to the difference between the two signals supplied to the inputs of the comparison amplifier 8. This correction signal alters the charge of a capacitor 12 to produce a persisting correction signal that is maintained until a new value of correction signal is produced by the comparison amplifier 8. The steady correction signal produced at the capacitor 12 is then supplied to the correction signal input of the addition stage 3 which was previously mentioned without explanation of its function. By means of this correction signal the d.c. offset of the input signal for every line scanning interval can then be regulated, i.e., the input signal can thereby have the lower edge of its range adjusted to the null point or any other desired point of the nonlinear characteristic curve (i.e., it is shifted to that point to correct for any tendency to deviate therefrom).

Time gating pulses illustrated in line (f) of FIG. 2 are supplied to the terminal 13 for gating the comparison amplifier 7. These gating pulses are located timewise in the vertical blanking interval. In consequence, at the output of the comparison amplifier 7, a correction signal is obtainable that corresponds to the difference between the signals respectively supplied to the inputs of the comparison amplifier. This correction signal is supplied to the capacitor 14 which thus maintains a steady correction signal until a new value of correction is provided by the comparison amplifier 7, which means the signal is held by the capacitor 14 for at least one picture field interval. The signal present at the capacitor 14 is supplied to one of the inputs of the multiplier 16 which was previously mentioned without specifying its function. The correction signal supplied to the multiplier 16 regulates the degree of amplification of the video signal.

For the operation of the clamping circuit 4, clamping pulses are supplied which are illustrated in line (h) of FIG. 2, these being supplied at the terminals 17 shown in FIG. 1. This circuit 4 for clamping the d.c. level of the video signal, like the differential amplifiers, addition circuit multiplying circuit, and so forth, is well known and does not need to be further described here.

Although the invention has been described with reference to a particular illustrative example, it will be understood that variations and modifications may be made within the inventive concept. Thus, the two series of control pulses used respectively for regulating the signal offset before entry into the nonlinear processing circuit and for regulating the amplification immediately following the output of the nonlinear processing circuit do not need to be located respectively in the horizontal and vertical blanking intervals. Pulses of both these series may be inserted in the horizontal blanking intervals, either alternately in successive horizontal blanking intervals or they may be both supplied within each of the horizontal blanking intervals, being distinguished one from the other by which comes first or in some other way. These modifications would, of course, involve corresponding modifications to the gating of the comparison amplifiers 7 and 8.

We claim:

1. Method of nonlinear transmission-processing of a video signal having horizontal and vertical video blanking intervals, with correction of tendencies for variation of signal offset and amplification with respect to a nonlinear characteristic of a transmission-processing stage, comprising the steps of:

inserting first and second series of control pulses in blanking intervals of said video signal prior to processing said video signal in said transmision-processing stage;

processing said video signal and said inserted pulses in said nonlinear processing stage;

comparing pulses of said first and second pulse series, as obtained from a signal derived from the output of said nonlinear transmission-processing stage, respectively with first and second reference signal values to produce first and second correction signals;

applying said first correction signal as a correction of said video signal prior to processing said video signal in said transmission-processing stage, and applying said second correction signal as a correction of said video signal following its processing by said transmission-processing stage.

2. Method according to claim 1, wherein said first correction signal is applied as an additive correction to said video signal prior to processing said video signal in said transmission-processing stage and said second correction signal is applied as a multiplicative correction of said video signal following processing of said video signal by said transmission-processing stage.

3. Method according to claim 2, wherein following application of said second correction signal as a correction of said video signal, said corrected video signal has its d.c. level clamped in each horizontal blanking interval for the following line scanning interval and the video signal as so clamped is utilized for comparing the said pulses of said first and second series inserted in blanking intervals of said video signal respectively with said first and second reference signal values.

4. Method according to claim 1, wherein one of said series of control pulses is inserted in horizontal blanking intervals of said video signal and the other of said series of control pulses is inserted in vertical blanking intervals of said video signal.

5. Method according to claim 4, wherein said first series of control pulses is inserted in horizontal blanking intervals of said video signal and said second series of control pulses is inserted in vertical blanking intervals of said video signals.

6. Method according to claim 1, wherein control pulses of said first and second series are inserted in alternation into successive horizontal blanking intervals of said video signal.

7. Method according to claim 1, wherein a pulse of said first control pulse series and a pulse of said second control pulse series are both inserted in each of said horizontal blanking intervals of said video signal.

8. Method according to claim 5, wherein the amplitude of said pulses of said first series, which are inserted in said horizontal blanking intervals, have an amplitude that lies near the black value level of the video signal and control pulses of said second series, which are inserted in said vertical blanking intervals, have an amplitude corresponding to the white level of said video signal.

9. Method according to claim 8, wherein the respective magnitudes of said first and second reference signals correspond to reference amplitude values of said control pulses respectively of said first and second series which values said control pulses under predetermined standard conditions when said pulses are obtained from said signal derived from the output of said nonlinear transmission-processing stage.

10. Apparatus for nonlinear transmission-processing of a video signal having horizontal and vertical video blanking intervals, with correction of tendencies for variation of signal offset and amplification with respect to a, nonlinear characteristic of a transmission-processing stage, comprising, in addition to said transmission-processing stage:

signal addition means (3) having an output connected to the input of said transmission-processing stage and connected for adding together said video signal, control pulses of a first control pulse series occurring in blanking intervals of said video signal, control pulses of a second control pulse series occurring in blanking intervals of said video signal and first correction signals;

signal multiplication means (16) having an input connected to the output of said transmission-processing stage and having another input for receiving temporarily constant second correction signals;

video signal clamping means (4) for clamping the video signal d.c. level in each horizontal blanking interval, said clamping means having its input connected to the output of said multiplication means (16) and having a first output for delivering video signals for further processing and a second output for particularly delivering said pulses of said first and second control pulse series, and first and second time-gated comparison means (8,7) having first inputs connected to said second output of said clamping means (4) and second inputs respectively connected to first and second reference signal sources (11,13), for producing at their respective outputs said first and second correction signals and supplying the same respectively to said signal addition means (3) and to said signal multiplication means (3), said comparison means each having means (12, 14) for maintaining the respective correction signals constant between successive time-gating operations of the respective comparison means.

11. Apparatus according to claim 10, wherein said first reference signal source for said second input of said first comparison means (8) is a source for supplying a d.c. reference signal of a value close to the black level value of said video signal and wherein said second reference signal source for said second input of said second comparison means (7) is a source for supplying a d.c. reference signal corresponding to the white value level of said video signal, and wherein, further, said means for inserting said first and second series of control pulses is constituted for inserting pulses of said first series in horizontal blanking intervals of said video signal and pulses of said second series in vertical blanking intervals of said video signal, and wherein said first comparison means (8) is time-gated for producing a comparison in horizontal blanking intervals of said video signal and said second comparison means (7) is time-gated for producing a comparison in vertical blanking intervals of said video signal.

12. Apparatus according to claim 10, wherein said nonlinear transmission-processing stage is a gamma stage.

* * * * *